US005189438A

United States Patent [19]

Hine et al.

[11] Patent Number: 5,189,438

[45] Date of Patent: Feb. 23, 1993

[54] DUAL RESERVOIR AND VALVE SYSTEM FOR AN INK JET HEAD

[75] Inventors: Nathan P. Hine; Paul A. Hoisington, both of Norwich; Charles W. Spehrley, Jr, Hartford; Melvin L. Biggs, Norwich, all of Vt.; Richard Carden, Canaan, N.H.

[73] Assignee: Spectra, Inc., Hanover, N.H.

[21] Appl. No.: 799,745

[22] Filed: Nov. 22, 1991

Related U.S. Application Data

[60] Continuation of Ser. No. 509,982, Apr. 19, 1990, abandoned, which is a division of Ser. No. 319,630, Mar. 6, 1989, Pat. No. 4,937,598.

[51] Int. Cl.[5] .......... G01D 15/16

[52] U.S. Cl. .......... 346/1.1; 346/140 R

[58] Field of Search .......... 346/140, 1.1

[56] References Cited

U.S. PATENT DOCUMENTS

| | | | |
|---|---|---|---|
| 4,323,907 | 4/1982 | Italiano | 346/140 R |
| 4,419,677 | 12/1983 | Kasugayama et al. | 346/140 R |
| 4,433,341 | 2/1984 | Thomas | 346/140 R |
| 4,475,116 | 10/1984 | Sicking et al. | 346/140 R |
| 4,502,055 | 2/1985 | Horike et al. | 346/75 |
| 4,514,742 | 4/1985 | Suga et al. | 346/140 R |
| 4,658,274 | 4/1987 | DeYoung | 346/140 R |
| 4,737,801 | 4/1988 | Ichihashi et al. | 346/140 R |
| 4,814,786 | 3/1989 | Hoisington et al. | 346/1.1 |

*Primary Examiner*—Mark J. Reinhart
*Attorney, Agent, or Firm*—Brumbaugh, Graves, Donohue & Raymond

[57] ABSTRACT

In the representative ink supply system described in the specification, continuous circulation of ink in an ink jet head is accomplished by providing two reservoirs connected to each ink jet orifice through corresponding passages so that ink flows continuously from a high-level reservoir past the orifice to a low-level reservoir. The difference between the levels of ink in the reservoirs is maintained relatively constant by inertial pumping during reciprocal motion of the ink jet head or by pressure transfer of ink from one reservoir to the other reservoir. Cross-flow purging of air or debris from the ink jet head is effected by covering the ink jet orifices and applying air pressure to one reservoir to cause ink and any trapped air or debris to flow from the head to the other reservoir. A pump responsive to reciprocal motion of the ink jet head generates a positive air pressure which is applied during purging and a negative air pressure which is applied to a deaerator for removing dissolved air from the ink.

25 Claims, 2 Drawing Sheets

DUAL RESERVOIR AND VALVE SYSTEM FOR AN INK JET HEAD

This application is a continuation of application Ser. No. 07/509,982, filed on Apr. 16, 1990, now abandoned which is a division of Ser. No. 07/319.630 filed on Mar. 6, 1989, now U.S. Pat. No. 4,937,598.

BACKGROUND OF THE INVENTION

This invention relates to systems for supplying ink to an orifice array in an ink jet head and, more particularly, to a new and improved ink supply system for an ink jet head.

In the copending Hine et al Application Ser. No. 43,369, filed Apr. 28, 1987, now U.S. Pat. No. 4,814,786, hot melt ink supplied to an ink jet head is circulated continuously by thermal convection to maintain pigment in suspension and to transfer ink from the region of the ink jet orifices to a deaerator. Although such thermal circulation is effective, it consumes energy and may raise the ink to temperatures not otherwise required for operation of the ink jet system.

In many ink jet systems, the proper operation of the ink jet is dependent upon the hydrostatic pressure of the ink supplied to the ink jet orifices. In some systems, such as described, for example, in the Sicking et al. U.S. Pat. No. 4,475,116, ink is supplied periodically to a reservoir on the ink jet head from a remote reservoir and, unless complex pressure control arrangements such as the bladder system described in that patent are provided, the change in level of the ink in the ink jet head reservoir between the maximum and minimum ink level conditions may interfere with the operation of the ink jet system.

As described, for example, in the Kasugayama et al. U.S. Pat. No. 4,419,677, insufficient hydrostatic pressure at the orifice of an ink jet head can cause the ink meniscus to retract within the orifice and, to overcome this condition, pressure must be applied. As described in that patent, air pressure is applied to the ink in the reservoir through a vent which normally maintains the reservoir at atmospheric pressure so as to force ink into the orifice, purging air from the ink jet head and restoring the ink meniscus to the proper place in the orifice. In a similar way, bubbles which may accumulate in the ink jet head can be ejected by applying increased pressure to the liquid in the reservoir through the orifice vent. On the other hand, as also described in that patent, excessive hydrostatic pressure at the ink jet orifice can cause the ink to leak from the orifice, producing a similarly undesirable condition.

Furthermore, when one or more air bubbles have formed or debris has accumulated in an ink jet head, interfering with the operation of the system, conventional ink jet systems, such as described in the Kasugayama et al. U.S. Pat. No. 4,419,677 and in the DeYoung U.S. Pat. No. 4,658,274, apply pressure to the ink in the reservoirs so as to eject ink out of the ink jet head through the orifices, thereby carrying the trapped air with it. Such outflow purging systems necessarily require relatively high-capacity ink capture and cleaning devices to collect and remove the substantial quantities of ink which are ejected through the orifices during purging processes.

SUMMARY OF THE INVENTION

Accordingly, it is an object of the present invention to provide a new and improved ink supply system for an ink jet head which overcomes the above-mentioned disadvantages of the prior art.

A further object of the invention is to provide a convenient and effective arrangement for continuous circulation of ink in an ink jet head system without additional heating or energy dissipation.

Another object of the invention is to provide a new and improved ink supply system for an ink jet head in which the hydrostatic pressure of the ink at the ink jet orifices is maintained within a relatively narrow range.

Another object of the invention is to provide a new and improved purging system for an ink jet head which eliminates the need for ejecting ink through the ink jet orifices to remove air bubbles or debris.

These and other objects of the invention are attained by providing an ink supply system for an ink jet head having first and second reservoirs communicating with an ink jet orifice and an arrangement for transferring ink from one reservoir to the other reservoir so that a relatively constant rate of ink circulation is provided. In one embodiment, ink is pumped by inertia from the first reservoir to the second reservoir through a valve as a result of the reciprocating motion of the ink jet head and, in another embodiment, air pressure or vacuum is applied to one reservoir to transfer ink to or from the other reservoir.

The ink jet head may also include a deaeration device through which ink is circulated continuously in flowing from one reservoir to the other. To accomplish purging of air without ejecting ink from the head, the orifices in the head are covered and pressure is applied to one reservoir to cause the ink and any trapped air to flow from the head to the other reservoir.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
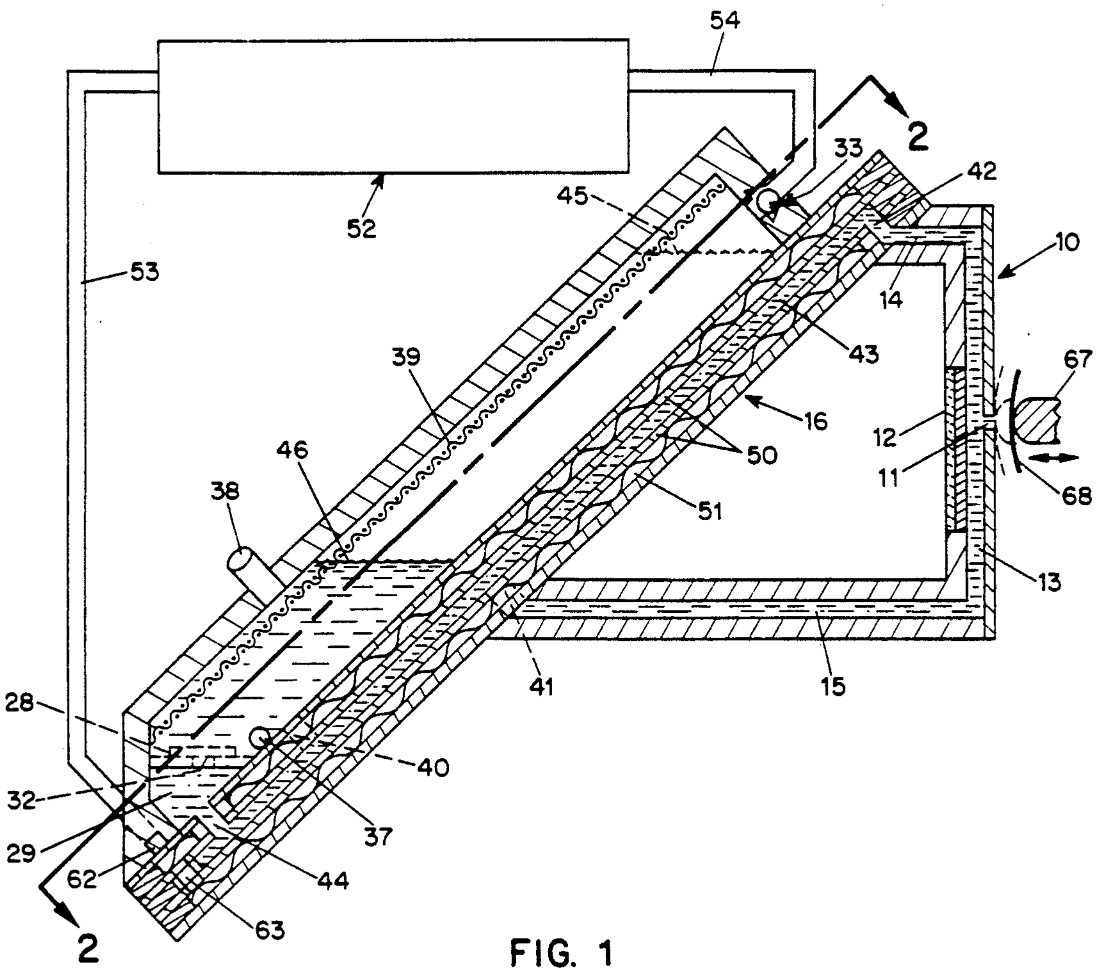
FIG. 1 is a schematic sectional side view of a representative embodiment of an ink supply system in accordance with the invention, taken along the lines 1—1 of FIG. 2 and looking in the direction of the arrows.
Figure 2:
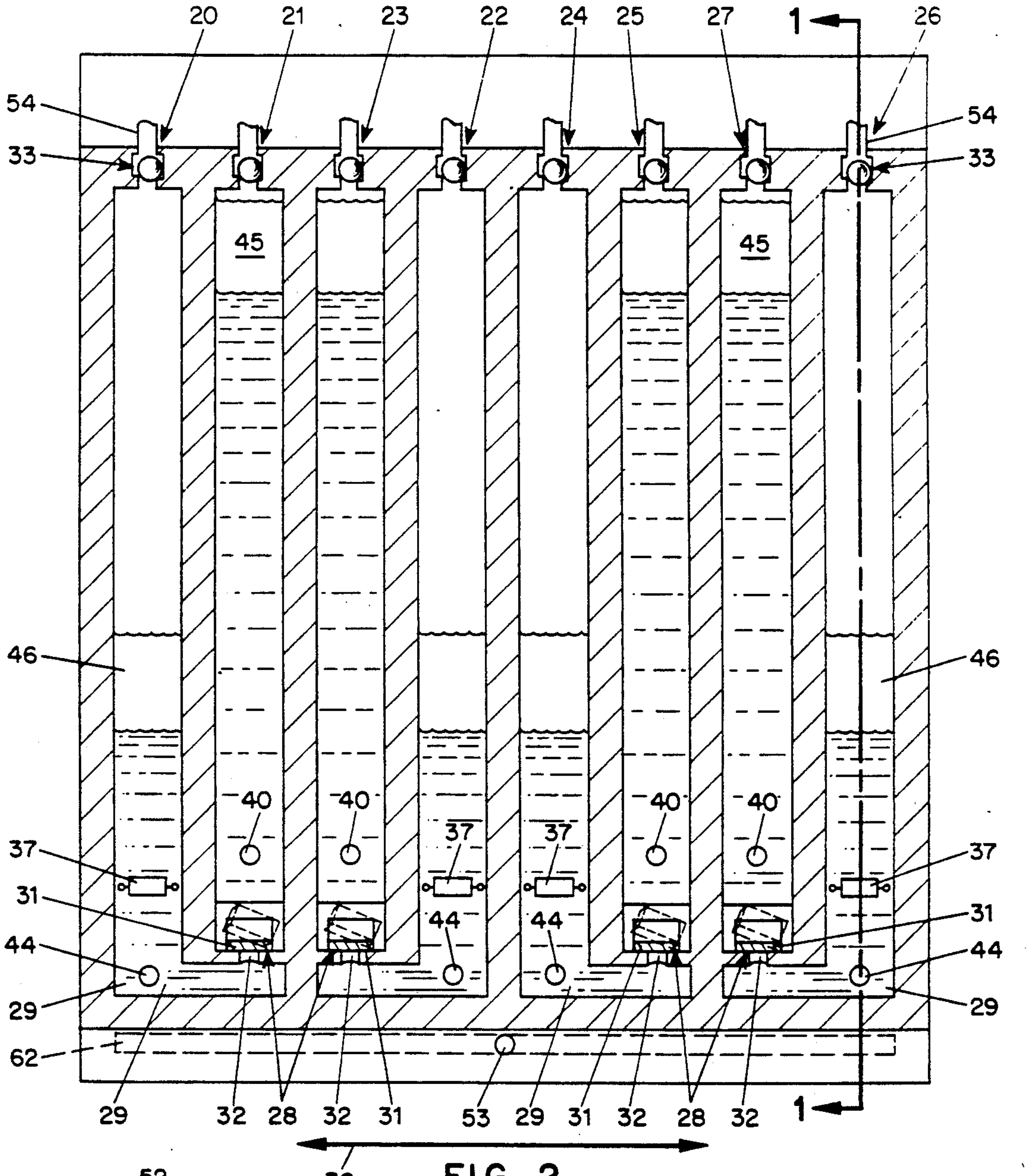
FIG. 2 is a schematic sectional view of the reservoir assembly of the ink supply system of FIG. 1, taken along the lines 2—2 of FIG. 1 and looking in the direction of the arrows.

In the typical embodiment of the invention shown in FIGS. 1 and 2, an ink jet head 10, schematically shown in FIG. 1, has a series of orifices 11, only one of which is visible in the sectional view of FIG. 1, through which drops of ink are ejected in the usual manner in response to actuation of a transducer 12. Ink is supplied to each orifice 11 through a passage 13 connected by conduits 14 and 15 to a deaerator arrangement 16 of the type described in the Hine et al. Application Ser. No. 273,383, filed Nov. 18, 1988.

As best seen in the sectional view of FIG. 2, four pairs of reservoirs 20–21, 22–23, 24–25 and 26–27 are provided so that four different types of ink, such as black and three primary colors, for example, may be supplied to different orifices 11 in the ink jet head. One of the reservoirs 20, 22, 24 and 26 of each pair is a relatively low-level reservoir and the other reservoir 21, 23, 25 and 27 of each pair is a relatively high-level reservoir. As described hereinafter, ink flows continuously at a relatively slow rate from the high-level reservoir to the low-level reservoir of each pair. Such continuous flow is effective to prevent settling of pigment in pigmented ink and also to transport the ink continuously through the deaerator arrangement.

At the lower end of the high-level reservoir 21, 23, 25 and 27 in each pair is a check valve 28 and the low-level reservoir 20, 22, 24 and 26 in each pair has a passage 29 extending from the main body of the reservoir horizontally beneath the check valve 28 of the other reservoir. During the operation of the ink jet system, the ink jet head 10 reciprocates in a direction perpendicular to the plane of FIG. 1 and parallel to the plane of FIG. 2 as shown by the arrow 30 so that ink selectively ejected from the orifices 11 produces a desired pattern on an adjacent record member (not shown) in the usual manner. In the illustrated embodiment, the check valves 28 are schematically shown in the form of flap members 31 which can move in response to pressure from the closed solid-line position covering an opening 32 between the reservoir and the adjacent passage 29 to the open dotted-line position shown in the drawing, permitting ink to pass from the low-level reservoirs 20, 22, 24 and 26 through the corresponding passages 29 to the high-level reservoirs 21, 23, 25 and 27 above the valves 28.

As shown in FIG. 1, the reservoirs in each pair are spaced in the direction of reciprocal motion of the head 10. Consequently, as the ink jet head reciprocates, acceleration of the reservoirs in the lefthand direction as viewed in FIG. 2 causes the inertia of the ink in the reservoirs 20 and 24 and the corresponding passages 29 to force the check valves in the reservoirs 21 and 25 open, permitting ink to pass from the reservoirs 20 and 24 into the reservoirs 21 and 25, respectively. At the same time, the check valves at the bottom of the reservoirs 23 and 27 remain closed since the inertia of the ink in the corresponding reservoirs and passages 29 reduces the pressure beneath those check valves rather than increasing it.

Upon deceleration of the reservoirs during the leftward motion and acceleration toward the right as viewed in FIG. 2, those check valves are closed and the check valves 28 at the bottom of the reservoirs 23 and 27 are opened by the inertia of the ink in the reservoirs 22 and 26 and the corresponding passages 29, causing the ink to pass from the reservoirs 22 and 26 into the reservoirs 23 and 27, respectively. During this motion, the check valves 28 at the bottom of the reservoirs 21 and 25 remain closed, since the inertia of the ink in the corresponding reservoirs and passages 29 reduces the pressure beneath those check valves rather than increasing it. This pumping action continues during each reciprocal motion cycle until an equilibrium difference in height is reached between the levels of the ink in the adjacent connected reservoirs. In this way, the reciprocating motion of the ink jet head tends to keep the reservoirs 21, 23, 25 and 27 at a relatively constant positive difference in level from the corresponding reservoir 20, 22, 24 and 26. Since the hydrostatic pressure at the ink jet orifice 11 is dependent upon the average of the ink levels in the two reservoirs to which it is connected as described hereinafter, variations in the difference in ink levels do not cause changes in the hydrostatic pressure at the orifice.

To prevent overfilling, a floating-ball-type valve 33 is provided at the upper end of each of the reservoirs. Alternatively, the reservoirs, the ink supply system and the passages 13 and 15 and other passages connecting each pair of reservoirs may be designed so that the acceleration to which the ink in the reservoirs is subjected during the operation of the system is not great enough to overfill the reservoirs. In still another alternative arrangement, overfilling of the higher-level reservoir can be prevented by providing an overflow passage between the higher-level reservoir and the lower-level reservoir of each pair if the application of air pressure to one of the reservoirs for purging or for refilling of the higher-level reservoir in the manner described hereinafter is not required.

At the lower end of each of the low-level reservoirs 20, 22, 24 and 26 from which ink is supplied to the high-level reservoirs, a low-ink detector device 37 is provided. The low-ink detector may consist, for example, of a thermistor which is periodically supplied with current and its resistance to current flow, which depends upon temperature, is detected. The thermistor 37 is operated in a constant temperature mode, so that, if the level of the ink in the reservoir falls below the position of the thermistor 37, the power drawn from the thermistor will be less than if the thermistor is immersed in ink.

As a result, the condition in which the ink is below the level of the thermistor is detected and ink is then supplied to the corresponding low-level reservoir 20, 22, 24 or 26 through a supply line 38 shown in FIG. 1, which may be of the type described, for example, in the Hine et al. Application Ser. No. 043,369, filed Apr. 28, 1987, in which a pump periodically supplies ink to a head reservoir through a supply line from a remote reservoir. In order to remove any contaminants from the ink supplied through the line 38, a filter screen 39 is mounted within each of the reservoirs 20, 22, 24 and 26 which receive ink through a corresponding supply line 38.

When ink is not being ejected from an orifice, the hydrostatic pressure at the orifice is a weighted average of the pressures produced by the levels of ink in the two reservoirs connected to the orifice, the weighting factors being representative of the flow resistances of the ink passages between the orifice and each of the reservoirs. By passing the ink continuously through the deaerators, this flow provides continuous deaeration of the ink and, if a pigmented ink is used, also prevents settling of the pigment. Flow rates of about 0.1 to 2 milliliters per hour, and preferably about 0.3 to 1 milliliter per hour, are adequate in most cases.

To provide continuous circulation of ink through the deaerators and at the same time supply ink to the corresponding orifices 11 in the ink jet head 10, each of the related high-level reservoirs 21, 23, 25 and 27 is connected through an aperture 40 at its lower end to a corresponding passage in the deaeration unit 16 which is directly beneath the corresponding reservoir and is not visible in the drawings. That passage is, in turn, connected through another passage 41, shown in dotted lines in FIG. 1, to the corresponding conduit 15 leading to the passage 13 which supplies ink to the corresponding orifice 11 in the ink jet head. Thus, as the ink flows from the higher-level reservoir to the ink jet orifice, it reaches a substantially deaerated state.

In order to permit circulation of ink in the passage 13 which is not ejected from the orifice back to the deaerator 16, the conduit 14 leading from the upper end of the passage 13 in the ink jet head transfers ink through an aperture 42 into a deaeration passage 43 through which the ink flows downwardly to an aperture 44 at the lower end which returns the ink to the lower end of the corresponding low-level reservoir 26. As shown in FIG. 2, each pair of reservoirs 20–21, 21, 22–23, 24–25 and 26–27 provides a similar flow path for ink from the higher-level reservoirs 21, 23, 25 and 27 through corresponding sections of the deaerator 16 and corresponding passages 15, 13 and 14, carrying the ink from the deaerator through the ink jet head to the corresponding orifices 11 and back through the return-flow passages 43 in the ink jet head to apertures 44 at the lower ends of the lower-level reservoirs 20, 22, 24 and 26.

Figure 5:
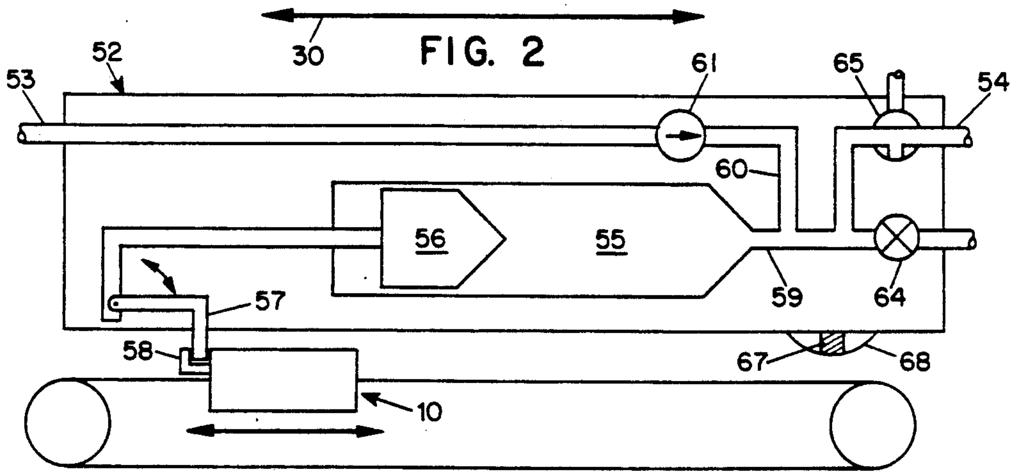
FIG. 5 is a schematic diagram illustrating a representative pressure and vacuum-generating system for use in the embodiment shown in FIG. 1.

As described in the Hine et al. Application Ser. No. 07/273,383, filed Nov. 18, 1988, the deaeration system 16 includes semipermeable membranes 50 forming the opposite walls of each of the ink passages 41 backed by vacuum plenums 51 to which subatmospheric pressure is applied in order to extract dissolved gases from the ink in the passages 43. To produce the required subatmospheric pressure, the ink jet system includes a pressure-and-vacuum generator system 52, mounted in fixed position and connected through a flexible vacuum line 53 and pressure line 54 to the ink jet head 10. The pressure-and-vacuum generator is selectively operated by the reciprocal motion of the ink jet head 10 in the manner schematically illustrated in FIG. 5. As shown in FIG. 5, the pressure-and-vacuum generator 52 includes a syringe pump 55 having a plunger 56 which may be selectively connected to the body of the reciprocating ink jet head 10. For this purpose, the plunger 56 carries a projectable arm 57 adapted to be received in a receptacle 58 on the ink jet head so that the plunger 56 is driven in the appropriate direction to produce vacuum or pressure at a syringe outlet 59. From the syringe outlet 59, a line 60 having a check valve 61 leads to the vacuum line 53 which is connected to the aerator vacuum plenums through a duct 62 and apertures 63 as shown in FIGS. 1 and 2.

The syringe outlet 59 is also connected through a valve 64 to the atmosphere and to a three-way valve 65 which, in the illustrated position, connects the syringe outlet 59 to the pressure line 54 connected to the valves 33 at the upper ends of the high-level reservoirs 21, 23, 25 and 27, as shown in FIG. 2. In the other position of the three-way valve 65, the valve connects the line 54 and the high-level reservoirs to the atmosphere. The valves 33 at the upper ends of the low-level reservoirs 20, 22, 24 and 26 lead directly to the atmosphere.

For cross-flow purging of air or debris from the ink jet head 10 in accordance with the invention, the valve 64 is closed and the arm 57 is engaged in the receptacle 58 to drive the plunger 56 to the right as viewed in FIG. 5, after which it is disengaged, the compressed air being retained in the syringe. The head 10 is then moved to a home position at which the orifices 11 of the head are covered by a movable bar 67 which urges a web 68 of absorbent paper or the like, shown in FIG. 1, against the orifices in the head, as described, for example, in the Spehrley et al. Application Ser. No. 275,096, filed Nov. 21, 1988. As shown in dotted outline in FIG. 1, this prevents outflow of ink from the orifices when the pressure of the ink in the passages 13 is raised. Thereafter, the three-way valve 65 is actuated to connect the syringe pump outlet 59 to the high-level reservoirs for about one second, permitting the syringe pressure to be applied to the ink in the reservoirs. Since the low-level reservoirs are open to the atmosphere, ink is forced from the high-level reservoirs 21, 23, 25 and 27 through the outlet apertures 40 and the corresponding deaerator passages to the conduits 15 of the ink jet head.

Because the orifices 11 are blocked by the bar 67, this forces the ink in the passages 13 and any air contained therein out through the passages 14 and the corresponding deaerator passages 43 communicating through the apertures 44 with the low-level reservoirs 20, 22, 24 and 26, thereby flushing any trapped air or debris out of the ink jet head 10 without causing any ink to be ejected from the orifices 11. When the purging is completed, the bar 67 is retracted to the position shown in solid lines in FIG. 1 and ink which has been deaerated in the deaerator 16 is supplied to the head for ejection from the orifices during the reciprocating motion of the ink jet head.

If necessary, outflow purging of air or debris from the ink jet head, as described in the Spehrley et al. Application Ser. No. 275,096, filed Nov. 21, 1988, can also be accomplished with this system. In this case, the bar 67 and paper web 68 are not held in contact with the orifices 11, but are retained in closely-spaced relation and the paper web 68 may be moved during the operation to receive and absorb the ink ejected from the orifices. The valve 65 is then connected to the syringe outlet 59, permitting the air pressure to be applied to the high-level reservoirs. This causes ink to flow under pressure from those reservoirs through the corresponding deaeration passages and through the conduits 15 to the passages 13, causing all of the ink in those passages to be ejected through the orifices 11, carrying with it any air or debris present in the ink jet head. While the increased pressure also causes ink to flow into the low-level reservoirs, the applied pressure is great enough to accomplish outflow purging. Alternatively, if desired, the low-level reservoirs could be capped or positive pressure from the line 54 could be applied to them during this purging operation.

To produce the vacuum required for the deaeration system 16, the three-way valve 65 is set to connect the high-level reservoirs to the atmosphere. The valve 64 is opened and the arm 57 is engaged in the receptacle 58 until the plunger 56 is at the righthand end of its stroke as viewed in FIG. 5, after which the valve 64 is closed. Motion of the plunger 56 to the left as viewed in FIG. 5 generates a vacuum at the syringe outlet 59 which is applied through the check valve 61 to the vacuum line 53 leading to the deaerators. Thereafter, the arm 57 is disengaged from the receptacle 58.

Figure 3:
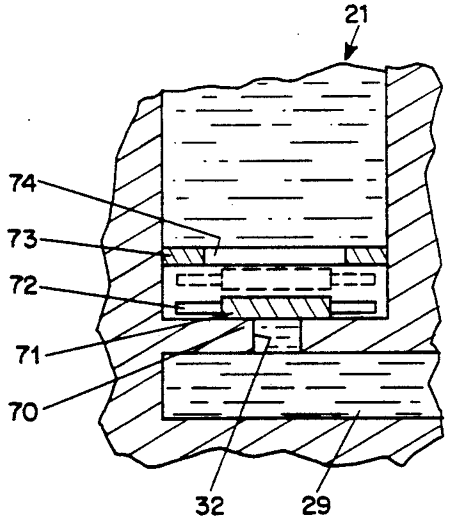
FIG. 3 is an enlarged fragmentary view illustrating one alternative form of valve arrangement in accordance with the invention.
Figure 4:
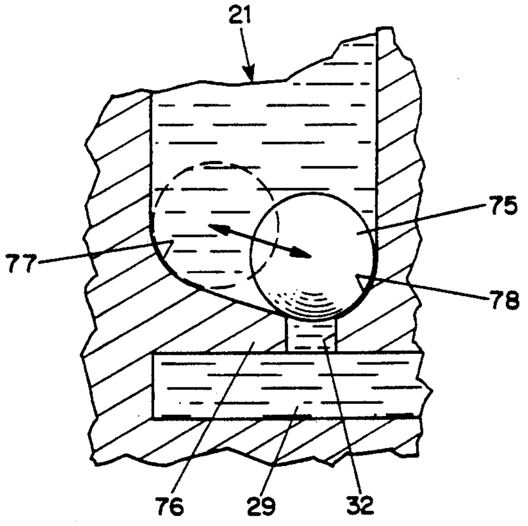
FIG. 4 is an enlarged fragmentary view illustrating another alternative valve arrangement in accordance with the invention.

FIGS. 3 and 4 illustrate alternative structures for the valves 28 which connect each pair of reservoirs. In FIG. 3, the valve comprises a captive plate 70 having a solid central body 71 and radially projecting arms 72 which serve to retain the plate in a central position within the reservoir 21, assuring that it will normally cover the opening 32 and prevent ink from flowing from the reservoir 21 into the passage 29. Spaced above the plate 70 is a retainer ring 73 having a central aperture 74 which is larger than the diameter of the plate body 71. Consequently, when the inertia of the ink in the passage 29 and reservoirs 20 and 21 during reciprocal motion of the head produces a pressure in the passage 29 which is greater than the pressure in the reservoir 21, the plate 70 is forced upwardly to the dotted-line position illustrated in FIG. 3 and ink can flow from the passage 29 through the opening 32 around the plate body 71 and into the reservoir 21. When the pressures in the reservoir 21 and the passage 29 are equalized, the plate returns to the position shown in solid lines in FIG. 3, preventing ink from returning from the reservoir 21 to the passage 29. If the plate 71 is made of magnetic material such as 440 stainless steel, it can be displaced by an external magnet if desired so as to eliminate the check valve when necessary for test work and the like.

Instead of providing projections 72 on the plate 71, the plate may be centered in the bottom of the reservoir by inward projections from the reservoir walls. In this case, the opening 74 should be smaller than the plate 71 and the ring 73 should have openings to permit ink to flow around the plate.

In the embodiment shown in FIG. 4, the valve consists of a ball 75 supported on a partition 76 between the passage 29 and the reservoir 21 which has a curved surface 77 that rises gradually with increasing slope away from the opening 32 on the left side of the opening as viewed in FIG. 4, and another curved surface 78 which rises abruptly away from the opening 32 on the right side. With this arrangement, the inertia of the ball 75 causes it to roll away from the opening 32 to the dotted-line position shown at the left when the ink jet head is accelerated to the right or decelerated during leftward motion as viewed in FIG. 4, permitting ink to flow from the passage 29 through the opening 32 into the reservoir 21. When the ink jet head is accelerated to the left or decelerated during rightward motion as viewed in FIG. 4, the ball 75 is restored to the position shown in solid lines in FIG. 4, blocking the passage 31 and the steeply rising slope 78 prevents the inertia of the ball from moving it away from the blocking position. Instead of the steeply rising slope 78, a pin or other blocking member may be provided to retain the ball in the blocking position. When the head is stationary, the ball 75 remains in the blocking position.

The ball 75 may be made of any suitable material heavier than the ink and the slopes of the surfaces 77 and 78 are selected based on the specific gravity of the material of which the ball is made and the acceleration and deceleration of the ink jet head during operation to cause the ball to move to the left, but not to the right, as viewed in FIG. 4 during the reciprocating motion of the reservoir assembly. Typical materials are glass, ceramics and metals such as stainless steel. If the ball is made of a magnetic type of stainless steel such as 440, it provides the added advantage of being movable if desired in response to an external magnet so as to eliminate the valve when necessary for test purposes and the like.

The surfaces 77 and 78 preferably have a continuously increasing slope extending from the aperture 31 to the vertical walls of the reservoir. This permits the ball 75 to be moved to the left and restored to its blocking position during acceleration and deceleration without producing any impact which might cause deterioration of the reservoir structure and contamination of the ink in the reservoir.

In a typical ink jet head arranged in accordance with the invention in which a reciprocating head motion of about 40 inches per second produced a force on the ink in the reservoirs and the passages 29 of about 3G during acceleration and deceleration at each change of the head direction, a desired hydrostatic pressure difference between the high- and low-level reservoirs of about 0.2 to 0.3 inches water gauge was produced and consistently maintained throughout operation with the maximum pressure being about 0.3 inch and the minimum about 0.1 inch. This range was narrow enough to allow a net negative hydrostatic pressure of about 0.5 to 2 inches at the orifices and thereby prevent any leakage of ink from the orifices while assuring sufficient ink circulation rates to provide proper operation of the jets.

Since the passages between the high-level reservoirs 21, 23, 25 and 27 and the corresponding low-level reservoirs 20, 22, 24 and 26 remain open and ink flows through the connecting passages between the high-level reservoir and the low-level reservoir as described above at a relatively slow rate, such as about 0.1 to 2 milliliters per hour and optimally about 0.5 milliliters per hour, the head 10 should be cycled back and forth several times during each hour if not in use in order to maintain the desired hydrostatic pressure.

As an alternative to the above-described inertial pumping of ink from the low-level reservoirs to the high-level reservoirs, transfer of ink may, if desired, be accomplished by applying negative pressure from the line 53 to the high-level reservoirs or positive air pressure from the line 54 to the lower-level reservoirs. In either case, the bar 67 and web 68 are moved against the orifices 11. If a ball valve of the type shown in FIG. 4 is used, this action is facilitated by the use of a magnetic ball and a magnet to displace the ball. If positive pressure is applied to the low-level reservoirs, the valves 65 are set to open the high-level reservoirs to the atmosphere and the plunger 56 is moved to the right as shown in FIG. 5 with the valve 64 closed. If negative pressure is applied to the high-level reservoirs, the valve 65 is set to connect the syringe outlet to the line 54 with the plunger 56 at the right end of the syringe and the plungers moved to the left as viewed in FIG. 5.

Although the invention has been described herein with reference to specific embodiments, many modifications and variations of the invention will readily occur to those skilled in the art. Accordingly, all such variations and modifications are included within the intended scope of the invention.

We claim:

1. An ink supply system for an ink jet head comprising first reservoir means, second reservoir means, deaeration means for extracting and removing dissolved gas from ink, orifice means for ejecting ink from the ink jet head, and ink passage means extending from the first reservoir means past the deaeration means and the orifice means to the second reservoir means, permitting ink to flow continuously from the first reservoir means through the deaerator means past the orifice means to the second reservoir means to maintain deaerated ink at the orifice means.

2. An ink supply system according to claim 1 including means for transferring ink from the second reservoir means to the first reservoir means.

3. An ink supply system according 6 to claim 1 wherein the means for transferring ink comprises means for applying a pressure differential between the first and second reservoir means.

4. An ink supply means according to claim 3 wherein the means for applying a pressure differential comprises means for applying a positive pressure to the second reservoir means.

5. An ink supply system according to claim 2 wherein the means for transferring ink comprises pump means.

6. An ink supply system according to claim 5 wherein the pump means comprises inertial pump means.

7. An ink supply system according to claim 1 including valve means between the first reservoir means and the second reservoir means.

8. An ink supply system according to claim 7 wherein the valve means comprises a member made of magnetic material to permit opening of the valve means with an external magnet.

9. A method for supplying ink to an orifice in an ink jet head which includes first and second reservoirs and a passage extending from the first reservoir past the orifice to the second reservoir comprising establishing a pressure difference between the ink in the first and second reservoirs, blocking the orifice to prevent ink from flowing out of the orifice and causing the ink to flow through the passage from the first reservoir past the orifice to the second reservoir to replace ink in the passage region adjacent to the orifice.

10. In an ink supply system for an ink jet head, unidirectional valve means responsive to unilateral pressure differences comprising rigid captive plate means confined for unattached limited motion between spaced retaining surfaces and normally retained against an opening and responsive to pressure to move away from the opening.

11. An ink supply system according to claim 10 wherein the captive plate means is retained between two openings and a plurality of projections extends from the captive plate means.

12. In an ink supply system for a movable ink jet head, inertially-responsive valve means comprising rigid blocking means movable in the direction of motion of the ink jet head and confined for limited motion between spaced retaining surfaces, the valve means being normally closed with the blocking means being normally positioned to block an opening and being responsive to acceleration of the ink jet head to move away from the opening.

13. In an ink supply system according to claim 12, means forming a surface adjacent to the opening having a slope on one side of the opening which permits the blocking means to move away from the opening upon acceleration of the ink jet head in one direction but not in the other direction.

14. In an ink supply system for a movable ink jet head, first and second ink reservoir means movable with the ink jet head, ink passage means connecting the first and second reservoir means, and inertial pump means, including an inertia member in the ink passage means movable in the direction of motion of the ink jet head, for controlling pump of ink from the first reservoir means to the second reservoir means.

15. A method according to claim 9 including the step of forcing ink from one of the reservoir to the other reservoir to establish the pressure difference.

16. A method according to claim 15 including applying pressure to force ink from one of the reservoirs to the other reservoir.

17. A method according to claim 9 including pumping ink from one reservoir to the other reservoir.

18. An ink supply system for an ink jet head comprising orifice means for ejecting ink from the ink jet head, first reservoir means, second reservoir means, ink passage means extending from the first reservoir means past the orifice means to the second reservoir means, blocking means for blocking the orifice means, and pressure means for applying pressure to the first reservoir means to cause ink to flow through a path from the first reservoir means through the passage means past the orifice means to the second reservoir means to purge the ink jet head.

19. An ink supply system according to claim 18 wherein the passage means includes dissolved gas removal means for extracting and removing dissolved gas from the ink.

20. An ink supply system for an ink jet head comprising orifice means for ejecting ink from the ink jet head, first reservoir means, second reservoir means, ink passage means extending from the first reservoir means past the orifice means to the second reservoir means, means for preventing ink from being discharged from the orifice means, and pressure means for applying pressure to one of the reservoir means to cause ink to flow through the passage means toward the other reservoir means to purge the ink jet head without ejecting ink through the orifice means.

21. An ink supply system for a reciprocating ink jet head comprising first reservoir means, second reservoir means, the first and second reservoir means being mounted on the ink jet head, orifice means, first ink passage means extending between the orifice means and the first reservoir means, second ink passage means extending between the orifice means and the second reservoir means, unidirectional valve means in the ink jet head for transferring ink between the first reservoir means and the second reservoir means in response to reciprocating motion of the head, supply means for supplying ink to the first reservoir means, and detector means for detecting a low ink level condition in the first reservoir means to initiate the supplying of ink thereto by the supply means.

22. An ink supply system according to claim 21 wherein the detector means comprises thermistor means.

23. An ink supply system according to claim 22 wherein the thermistor means is a constant temperature thermistor.

24. A method according to claim 17 including pumping ink from one reservoir to the other reservoir by inertial pumping.

25. A method according to claim 9 including causing ink to flow through a deaerator between at least one of the reservoirs and the orifice.

* * * * *

UNITED STATES PATENT AND TRADEMARK OFFICE
CERTIFICATE OF CORRECTION

PATENT NO. : 5,189,438

DATED : February 23, 1993

INVENTOR(S) : Nathan P. Hine et al.

It is certified that error appears in the above-identified patent and that said Letters Patent is hereby corrected as shown below:

First page, Item 60, 1st line: The date "Apr. 19" should read --Apr. 16--.

Column 5, line 17: The reference numerals "20-21, 21" should read --20-21--.

Column 8, line 65: The words "according 6" should read --according--.

Column 9, line 61: The word "pump" should read --pumping--.

Signed and Sealed this

Twenty-ninth Day of March, 1994

Attest:

BRUCE LEHMAN

*Attesting Officer* *Commissioner of Patents and Trademarks*